US006606552B2

(12) United States Patent
Haimerl et al.

(10) Patent No.: US 6,606,552 B2
(45) Date of Patent: Aug. 12, 2003

(54) CONTROL DEVICE FOR FINAL CONTROL ELEMENTS OF AN INTERNAL COMBUSTION ENGINE, CONTROL UNIT FOR ACTUATOR DRIVES OF AN INTERNAL COMBUSTION ENGINE AND A METHOD FOR CONTROLLING AN INTERNAL COMBUSTION ENGINE

(75) Inventors: Michael Haimerl, Cham (DE); Wolf-Dieter Pöhmerer, Regensburg (DE); Hans-Jürgen Reichl, Salching (DE); Ulli Christian Sagmeister, Postmünster (DE); Markus Teiner, Regensburg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/158,755

(22) Filed: May 30, 2002

(65) Prior Publication Data

US 2002/0173902 A1 Nov. 21, 2002

Related U.S. Application Data

(63) Continuation of application No. PCT/DE00/04242, filed on Nov. 28, 2000.

(30) Foreign Application Priority Data

Nov. 30, 1999 (DE) ........................................ 199 57 537

(51) Int. Cl.$^7$ .......................... G06F 19/00; F02D 45/00

(52) U.S. Cl. .................... 701/115; 123/406.6; 701/110; 701/114

(58) Field of Search ................................ 701/115, 110, 701/114, 102; 123/406.58, 406.6, 406.61, 406.65; 73/117.3, 116

(56) References Cited

U.S. PATENT DOCUMENTS

| | | | | | |
|---|---|---|---|---|---|
| 4,267,810 | A | * | 5/1981 | Wesemeyer et al. | 123/406.61 |
| 4,482,962 | A | * | 11/1984 | Amano et al. | 701/114 |
| 4,744,243 | A | * | 5/1988 | Tanaka | 73/117.3 |
| 4,941,442 | A | * | 7/1990 | Nanyoshi et al. | 123/481 |
| 4,962,470 | A | * | 10/1990 | Hansen | 702/151 |
| 4,977,508 | A | * | 12/1990 | Tanaka et al. | 701/111 |
| 5,201,296 | A | | 4/1993 | Wunning et al. | 123/479 |
| 6,208,930 | B1 | * | 3/2001 | Uematsu | 701/110 |

FOREIGN PATENT DOCUMENTS

| | | |
|---|---|---|
| DE | 41 31 497 A1 | 3/1993 |
| DE | 43 13 331 A1 | 10/1994 |
| DE | 43 27 455 A1 | 2/1995 |
| DE | 43 30 906 A1 | 3/1995 |
| DE | 43 31 226 A1 | 3/1995 |
| DE | 44 44 751 A1 | 6/1996 |
| DE | 197 45 765 A1 | 4/1998 |

* cited by examiner

*Primary Examiner*—Hien T. Vo
(74) *Attorney, Agent, or Firm*—Laurence A. Green; Werner H. Stemer; Ralph E. Locher

(57) ABSTRACT

A control device for an internal combustion engine has a device for generating control commands for controlling final control elements in accordance with at least one measured value. The control device also has a communications interface for exchanging messages with a control unit for final control elements. A counter is also provided, the status of the counter being dependent on pulses of a measuring signal of an incremental crankshaft angle sensor. The control commands contain desired counter statuses for carrying out the control task. A control unit also has a counter whose counter status depends on the pulses of the measuring signal of the incremental crankshaft angle sensor. Also provided is a device for carrying out the control tasks in accordance with the counter status and the desired counter status.

13 Claims, 3 Drawing Sheets

CONTROL DEVICE FOR FINAL CONTROL ELEMENTS OF AN INTERNAL COMBUSTION ENGINE, CONTROL UNIT FOR ACTUATOR DRIVES OF AN INTERNAL COMBUSTION ENGINE AND A METHOD FOR CONTROLLING AN INTERNAL COMBUSTION ENGINE

CROSS-REFERENCE TO RELATED APPLICATION

This application is a continuation of copending International Application No. PCT/DE00/04242, filed Nov. 28, 2000, which designated the United States and was not published in English.

BACKGROUND OF THE INVENTION

Field of the Invention

The invention relates to a control device for final control elements of an internal combustion engine, a control unit for actuator drives of an internal combustion engine, and a method for controlling an internal combustion engine.

Prior art control devices for final control elements of internal combustion engines generate, inter alia, control signals for controlling final control elements and control commands for actuating actuator drives, the control signals and control commands for controlling final control elements being dependent on at least one measured variable such as an accelerator pedal value or the rotational speed.

The final control elements can be driven by actuator drives. For the actuator drives, to a certain extent control units are provided that generate actuating signals for the actuator drives of the internal combustion engine as a function of the control commands of the control device. Both the control device and the control unit have one communications interface each, to which a bus, for example, the CAN bus, can be connected. The control device can then transmit the control commands through the interface and the bus to the control unit that then carries out the corresponding control functions. Such control commands may, for example, include the crankshaft angle at which charge cycle valves are to be opened or closed.

U.S. Pat. No. 5,201,296 to Wunning et al. discloses an internal combustion engine in which the valves and injection processes are controlled as a function of a signal of a crankshaft angle sensor such that control processes are triggered as a function of the position of the crankshaft.

The prior art includes transmitting the control commands segment-synchronously onto the bus. A segment is defined by the distance between two successive dead center points of the pistons of two cylinders that directly follow one another in the ignition sequence. Here, the control command contains setpoint crankshaft angles that are each related to the top dead center during the ignition of the respective cylinder. The control commands are, therefore, always related to the respective crankshaft angles. Such a relationship has the disadvantage that the reference base for the crankshaft angle of each cylinder is different and depends on the number of clock cycles of the working cycle. In addition, control commands can also be transmitted only for the time horizon of a working cycle because, beyond it, the crankshaft angle is no longer unambiguous.

SUMMARY OF THE INVENTION

It is accordingly an object of the invention to provide a control device for final control elements of an internal combustion engine, a control unit for actuator drives of an internal combustion engine, and a method for controlling an internal combustion engine that overcomes the hereinafore-mentioned disadvantages of the heretofore-known devices and methods of this general type and that ensures easy operation of the internal combustion engine in different operating modes with unchanged control commands.

With the foregoing and other objects in view, there is provided, in accordance with the invention, a control device for final control elements of an internal combustion engine having sensors sensing at least one measured variable, an incremental crankshaft angle sensor having an increment number and supplying a measurement signal having pulses, final control elements, actuator drives connected to the final control elements, and a control unit having a synchronizer for synchronizing counters and a control unit counter with a counter reading, the control unit at least in part driving the final control elements with the actuator drives, the control device including a control command generator connected to the actuator drives and controlling the actuator drives as a function of the at least one measured variable, the generator generating control commands with setpoint counter readings for execution of control functions of the engine, a communications interface for exchanging messages with the control unit, the interface connecting the control command generator to the control unit, a revolving counter independent of the control unit counter and having a counter reading dependent upon parameters including the pulses of the measurement signal of the crankshaft angle sensor and independent from the increment number of the crankshaft angle sensor during a working cycle of the engine, the counter reading of the revolving counter and the counter reading of the control unit counter synchronized through the synchronizer of the control unit, and the counter reading of the control unit counter being dependent upon the parameters.

The invention is characterized by the fact that the internal combustion engine can be operated in different operating modes, such as two stroke, four stroke, six stroke, or eight stroke, without the control commands having to be changed.

In accordance with another feature of the invention, the revolving counter is a dual counter with a predefined bit length.

In accordance with a further feature of the invention, the counter reading of the revolving counter interpolates between the pulses of the measurement signal.

In accordance with an added feature of the invention, the final control elements are gas exchange valves.

With the objects of the invention in view, there is also provided a control unit for actuator drives of an internal combustion engine having a control device generating control commands for controlling the actuator drives, the control commands containing setpoint counter readings for execution of engine control functions, a communications interface for exchanging data with the control device, an incremental crankshaft angle sensor having an increment number and generating a measurement signal having pulses, and a counter with a first counter reading, the control unit including a revolving counter independent from the counter and having a second counter reading dependent upon parameters including the pulses of the measurement signal and independent of the increment number of the crankshaft angle sensor during a working cycle of the engine, a controller executing the engine control functions as a function of the second counter reading and the setpoint counter readings, a synchronizer for synchronizing the second counter reading and the first counter reading, and the first counter reading being dependent upon the parameters.

In accordance with an additional feature of the invention, the second counter reading interpolates between the pulses of the measurement signal.

In accordance with yet another feature of the invention, the actuator drives are drives for charge cycle valves.

With the objects of the invention in view, there is also provided a method for controlling an internal combustion engine having actuator drives, including the steps of generating control commands for controlling the actuator drives as a function of at least one measured variable in a control device, the control commands containing setpoint counter readings for an execution of engine control functions, transmitting the control commands to a control unit for the actuator drives, changing a counter reading of a first counter as a function of pulses of a measurement signal from an incremental crankshaft angle sensor having an increment number, the first counter being a revolving counter with a maximum counter reading independent of the increment number of the crankshaft angle sensor during a working cycle of the engine, and executing, in the control unit, the engine control functions predefined by the control commands as a function of the counter reading of the first counter, the setpoint counter readings, and a counter reading of a second counter independent of the first counter.

Other features that are considered as characteristic for the invention are set forth in the appended claims.

Although the invention is illustrated and described herein as embodied in a control device for final control elements of an internal combustion engine, control unit for actuator drives of an internal combustion engine, and a method for controlling an internal combustion engine, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
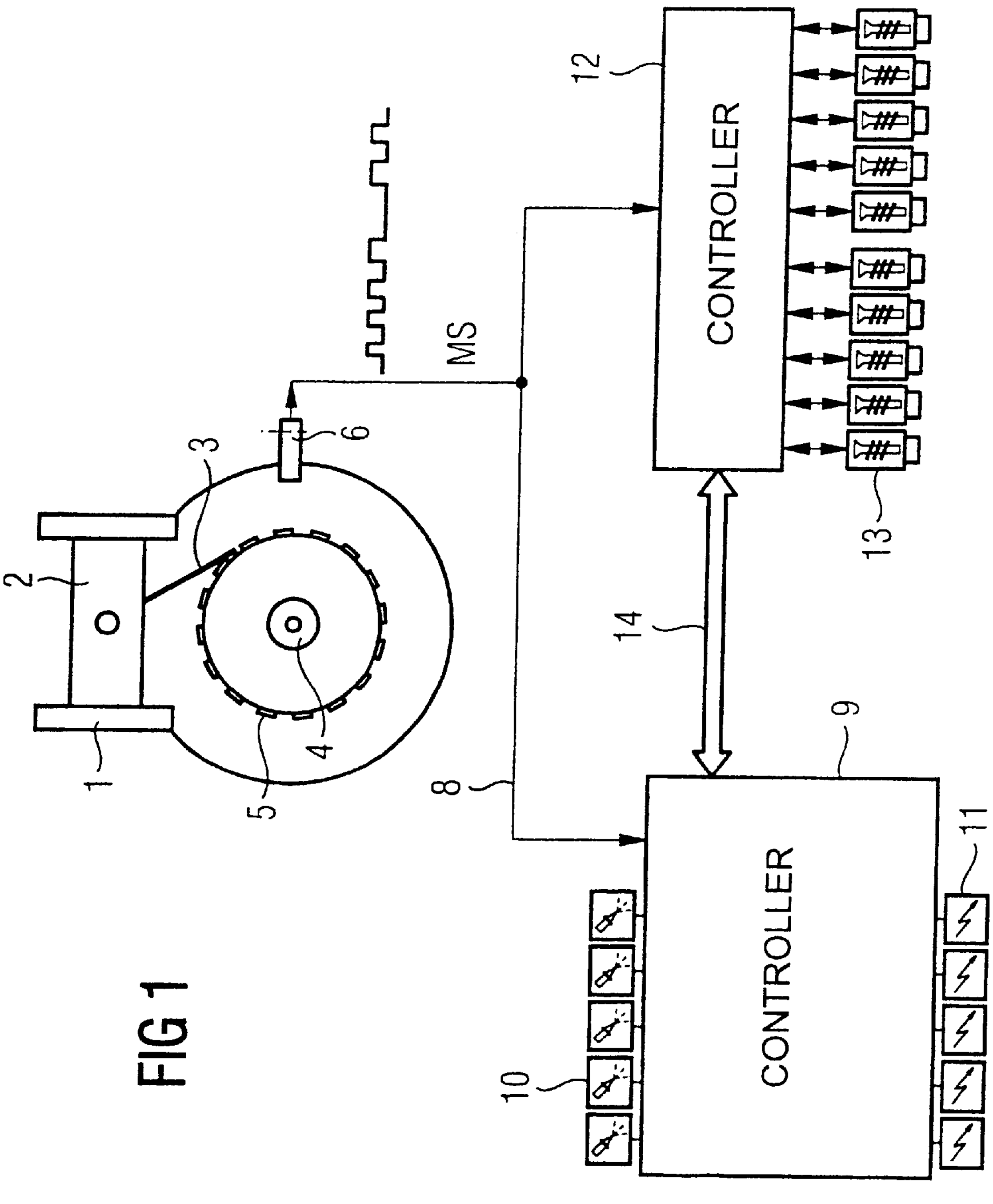
FIG. 1 is a diagrammatic and block circuit diagram of an internal combustion engine with a control device and a control unit according to the invention.

Referring now to the figures of the drawings in detail and first, particularly to FIG. 1 thereof, there is shown an internal combustion engine having a cylinder 1 in which a piston 2 is movably disposed. The piston 2 is coupled to a crankshaft 4 through a connecting rod 3.

A crankshaft angle sensor is provided that includes an angle sensor 5 disposed on the crankshaft 4 and that is preferably embodied as a gear wheel. The gear wheel has, for example, sixty teeth that, with the exception of a defined gap, are equal distances apart or whose rising or falling edges are equal distances apart.

In addition, the crankshaft angle sensor has a measuring pickup 6 that is preferably embodied as a Hall element and is permanently disposed in the crank casing of the internal combustion engine. The measuring pickup 6 generates a pulse-shaped measurement signal MS when the crankshaft 4 rotates. At a constant rotational speed, the measurement signal MS has a constant period length of the pulses with the exception of a relatively long period length due to the gap in the gear wheel or also a uniform mark-to-space ratio with the exception of a relatively long space per revolution, due to the gap in the gear wheel. The relatively long gap or relatively long period length serves as a synchronizing signal SYNC.

A control device 9 for final control elements is provided for controlling operating functions of the internal combustion engine. Sensors that pick up various measured variables and that each determine the measured value of the measured variable are associated with the control device 9. The control device 9 determines, as a function of at least one measured variable, one or more control signals that each control an actuator or else control commands for a control unit 12.

The sensors include, for example, a pedal position sensor, a throttle valve position sensor, an air flow rate meter, a temperature sensor, the crankshaft angle sensor, or further sensors.

Furthermore, the control device 9 has final control elements. The final control elements each form, together with an actuator drive, an actuator. The actuator drives include, for example, an electromotive drive, an electromagnetic drive, or a further conventional drive. The final control elements are embodied, for example, as a throttle valve, as an injection valve 10, or as a spark plug 11.

The control device 9 is connected to the measuring pickup 6 through a signal line 8. In addition, it is connected to a control unit 12 through a bus 14 that is preferably embodied as a CAN bus. For the connection of the bus, respective communication interfaces are provided in the control device 9 and the control unit 12. However, the communications interfaces may also be embodied, for example, as transmitter and/or receiver devices for the wireless transmission of information.

The control unit 12 determines and generates actuating signals for actuating electromechanical actuator drives 13 for charge cycle valves of the internal combustion engine. The control unit 12 communicates with the control device 9 through the bus 14. The control device 9 generates control commands relating, for example, to the start of opening and the end of opening of the charge cycle valves.

The control unit is also connected to the measuring pickup 6 through the signal line 8.

Figure 2:
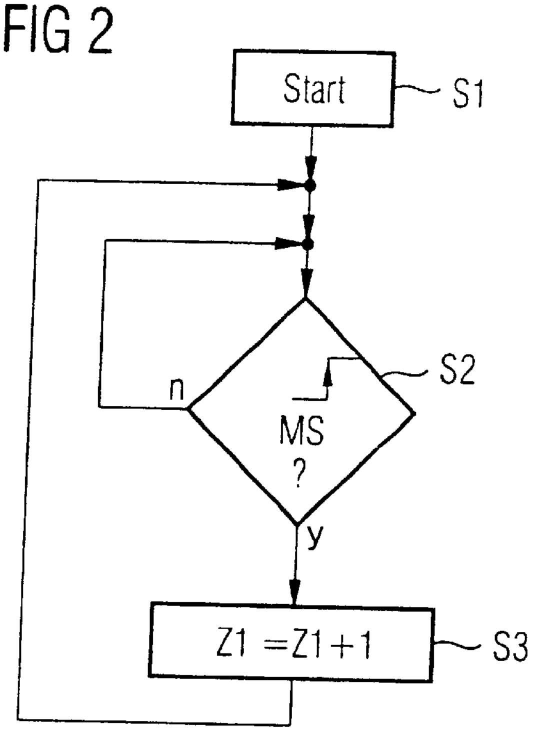
FIG. 2 is a flowchart for determining a first counter reading according to the invention.

FIG. 2 is a flowchart of a program for determining the counter reading of a first counter Z1 that runs in the control device 9.

In a step S1, the program is started.

In a step S2, it is checked whether or not the measuring signal MS has a rising edge. If such is not the case, the condition of the step S2 is checked again, if appropriate after a predefined delay. If the condition of the step S2 is, however, fulfilled, the first counter Z1 is incremented by the value one.

The first counter is preferably initialized (for example, to zero) in the step S1. The first counter Z1 is preferably a dual counter with, for example, ten bits. Thus, the counter reading of the first counter unambiguously defines the respective crankshaft angle for more than seventeen revolutions of the crankshaft. The counter then overflows and starts to run again from its zero value. Thus, an overflow of the counter takes place after more than 17 revolutions of the crankshaft. Interpolating the counter value between two successive edges of the measurement signal can increase the precision of the resolution of the crankshaft angle further. For such a purpose, for example, a fine counter may be provided that is preferably a dual counter with, for example, six bits.

Figure 3:
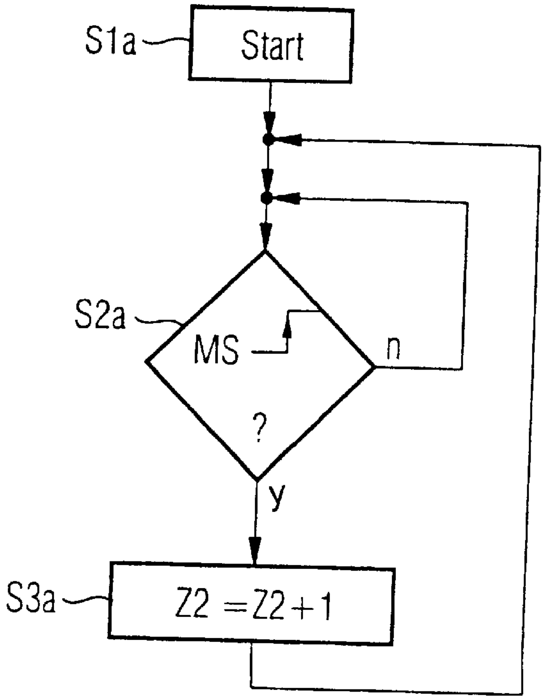
FIG. 3 is a flowchart for determining a second counter reading according to the invention.

FIG. 3 illustrates a corresponding flowchart of the program that is processed in the control unit 12.

The program is started in a step S1*a*, in which a second counter Z2 is preferably initialized. The initialization preferably takes place directly after the reception of the synchronizing signal that is characterized by the lengthened space in the pulse signal of the measurement signal MS that is brought about by the gap on the gear wheel of the measured value sensor. The initialization of the first counter Z1 also preferably takes place in step S1 in the control device directly after the reception of the synchronizing signal. Such a process has the advantage that the counters Z1, Z2 of the control device 9 and of the control unit 12 are synchronized.

In a step S2*a*, it is checked whether or not the measurement signal MS has a rising edge. If it does not have a rising edge, the condition of the step 2*a* is checked again, if appropriate after a predefined waiting time. However, if it has a rising edge, in a step S3*a*, the second counter Z2 is increased by the value 1.

The statements relating to the first counter Z1 apply accordingly to the second counter Z2. In the steps S2 in FIG. 2 and S2*a* in FIG. 3, it is possible also, as an alternative, to check whether or not the measurement signal MS has a falling edge. It is advantageous if the first and second counters Z1, Z2 have the same bit length or at least if the control device 9 and/or the control unit 12 know the respective bit length of the first and second counters Z1, Z2.

The control device 9 generates control commands for controlling the final control elements, embodied as charge cycle valves, as function of at least one measured variable, such as the rotational speed, the accelerator pedal value of a pedal value sensor, or further measured variables. The control commands may be, for example, the command for opening one or more charge cycle valves associated with a cylinder or for closing such valves. The control commands respectively include a setpoint counter reading that the second counter Z2 is to assume in the control unit if the control function associated with the control command is to be executed. The control function may be, for example, the opening or closing or the excitation of a charge cycle valve. Electromechanical actuator drives 13 for controlling the charge cycle valves are preferably associated with the control unit 12.

Figure 4:
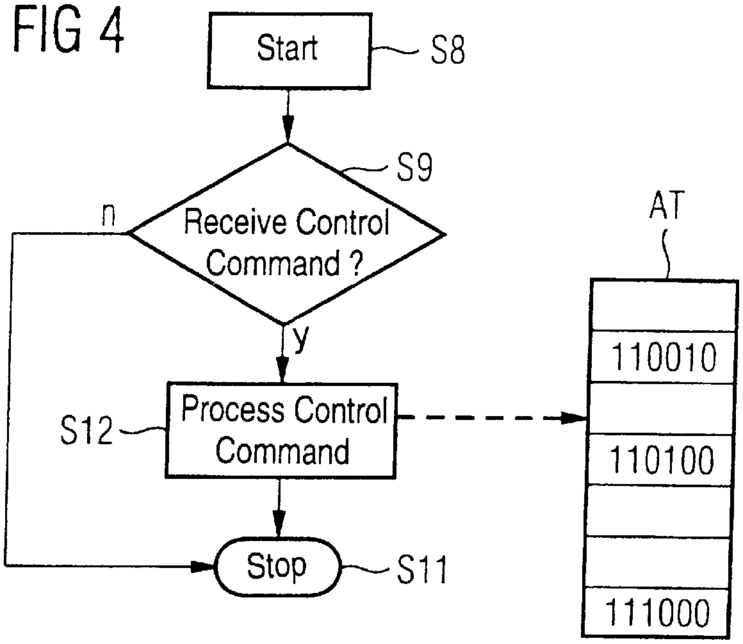
FIG. 4 is a flowchart of a program that is executed in the control unit for the evaluation of the control commands according to the invention.

FIG. 4 illustrates a program that is preferably carried out cyclically or also as an interrupt procedure in the control unit 12. The program is started in a step S8.

In a step S9, it is checked whether or not a control command has been received from the control device 9 through the communications interface of the control unit 12. If the command has not been received, the program is stopped in a step S11. However, if the control command has been received, the control command is processed into a step S12. In an action table AT, the setpoint counter reading that has been transferred with the control command and the associated action, for example, valve-opening or valve-closing, are stored in the action table. In a step S11, the program is then stopped. The program is then preferably either called again after the occurrence of the event "receive control command" or after a predefined waiting time.

Figure 5:
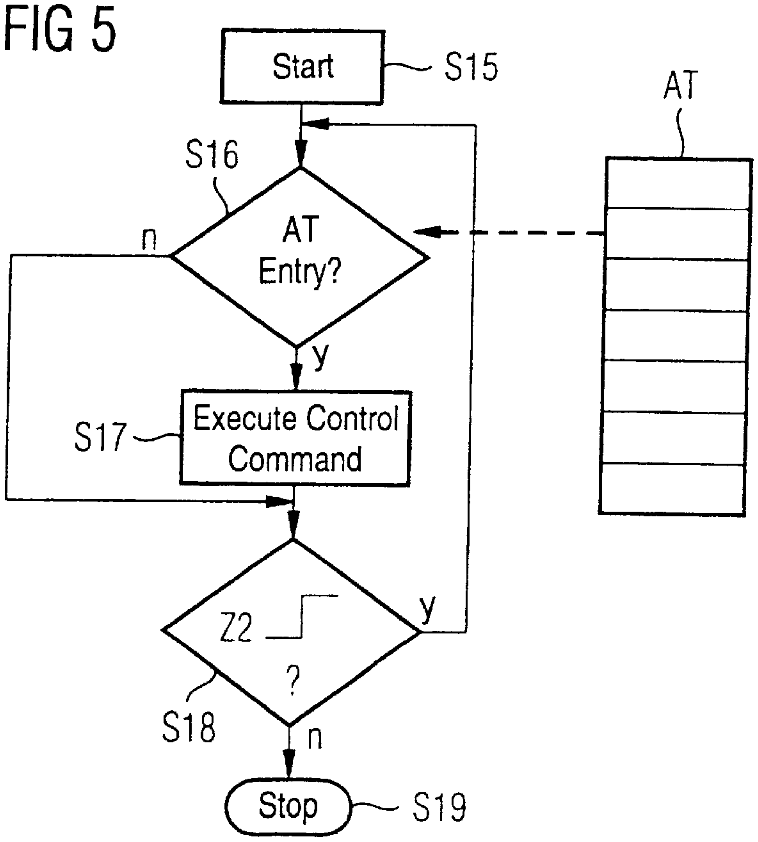
FIG. 5 is a flowchart of a further program that is executed in the control unit for the execution of a control command according to the invention.

A further program that is represented in FIG. 5 is preferably processed cyclically or else as an interrupt procedure in the control unit 12. The program is started in a step S15.

In a step S16, it is checked whether or not the action table AT contains an entry with a setpoint counter reading that corresponds to the current counter reading of the second counter Z2.

If the entry is not present, the processing is continued in a step S18. However, if the entry is present, the corresponding control command is read out from the action table in a step S17 and executed.

The processing is then continued in the step S18 in which it is checked whether or not the counter reading has changed since the execution of the step S16. If the reading has not changed, the program is stopped. Otherwise the processing is continued in the step S16.

The control commands that are provided for actuating the final control elements of the various cylinders can all be stored in the common action table AT because the counter readings are independent of a reference to the respective top dead center during ignition or some other cylinder-specific reference point. For such a reason, it is also possible easily to implement a two, four, six, or eight stroke operating mode of the internal combustion engine without adaptations to the control commands and of the interfaces of the control device and of the control unit being necessary.

The transmission of the control commands from the control device 9 to the control unit 12 can, in principle, take place at any time taking into account the computing time necessary for processing. By the revolving first and second counter, a reference is made that is available both in the control device 9 and in the control unit 12.

Further advantages are that the control commands do not need to be modified for use in different engine configurations, for example, different cylinder numbers. Due to the process according to the invention, optimum transmission time point or transmission the control device 12 can define crankshaft angles for the control commands. They do not need to be defined for maximum rotational speed for which calculation and actuating times are sufficient.

It is particularly advantageous if the values of the first and second counter Z1, Z2 are stored in the control device 9 and in the control unit 12 whenever the synchronizing signal is received and, then, either the control device 9 or the control unit 12 transmits its own counter reading to the other, that is to say, the control unit 12 or the control device 9 that can then synchronize itself with the respective other counter reading. Such a configuration ensures a common counter base.

We claim:

1. A control device for final control elements of an internal combustion engine having sensors sensing at least one measured variable, an incremental crankshaft angle sensor having an increment number and supplying a measurement signal having pulses, final control elements, actuator drives connected to the final control elements, and a control unit having a synchronizer for synchronizing counters and a control unit counter with a counter reading, the control unit at least in part driving the final control elements with the actuator drives, the control device comprising:

a control command generator connected to the actuator drives and controlling the actuator drives as a function of the at least one measured variable, said generator generating control commands with setpoint counter readings for execution of control functions of the engine;

a communications interface for exchanging messages with the control unit, said interface connecting said control command generator to the control unit;

a revolving counter independent of the control unit counter and having a counter reading:

dependent upon parameters including the pulses of the measurement signal of the crankshaft angle sensor; and independent from the increment number of the crankshaft angle sensor during a working cycle of the engine;

said counter reading of said revolving counter and the counter reading of the control unit counter synchronized through the synchronizer of the control unit; and the counter reading of the control unit counter being dependent upon said parameters.

2. The control device according to claim 1, wherein said revolving counter is a dual counter with a predefined bit length.

3. The control device according to claim 1, wherein said counter reading of said revolving counter interpolates between the pulses of the measurement signal.

4. The control device according to claim 1, wherein the final control elements are gas exchange valves.

5. A control device for final control elements of an internal combustion engine having sensors sensing at least one measured variable, an incremental crankshaft angle sensor having an increment number and supplying a measurement signal having pulses, final control elements, actuator drives connected to the final control elements, and a control unit having a synchronizer for synchronizing counters and a control unit counter with a counter reading, the control unit at least in part driving the final control elements with the actuator drives, the control device comprising:

a means for generating control commands connected to the actuator drives and controlling the actuator drives as a function of the at least one measured variable, said control command generating means generating control commands with setpoint counter readings for execution of control functions of the engine;

a communications interface for exchanging messages with the control unit, said interface connecting said control command generating means to the control unit;

a revolving counter independent of the control unit counter and having a counter reading:

dependent upon parameters including the pulses of the measurement signal of the crankshaft angle sensor; and independent from the increment number of the crankshaft angle sensor during a working cycle of the engine;

said counter reading of said revolving counter and the counter reading of the control unit counter synchronized through the synchronizer of the control unit; and the counter reading of the control unit counter being dependent upon said parameters.

6. In an internal combustion engine having sensors sensing at least one measured variable, an incremental crankshaft angle sensor having an increment number and supplying a measurement signal having pulses, final control elements, actuator drives connected to the final control elements, and a control unit having a synchronizer for synchronizing counters and a control unit counter with a counter reading, the control unit at least in part driving the final control elements with the actuator drives, a control device for the final control elements comprising:

a control command generator connected to the actuator drives and controlling the actuator drives as a function of the at least one measured variable, said generator generating control commands with setpoint counter readings for execution of control functions of the engine;

a communications interface for exchanging messages with the control unit, said interface connecting said control command generator to the control unit;

a revolving counter independent of the control unit counter and having a counter reading:

dependent upon parameters including the pulses of the measurement signal of the crankshaft angle sensor; and independent from the increment number of the crankshaft angle sensor during a working cycle of the engine;

said counter reading of said revolving counter and the counter reading of the control unit counter synchronized through the synchronizer of the control unit; and the counter reading of the control unit counter being dependent upon said parameters.

7. A control unit for actuator drives of an internal combustion engine having a control device generating control commands for controlling the actuator drives, the control commands containing setpoint counter readings for execution of engine control functions, a communications interface for exchanging data with the control device, an incremental crankshaft angle sensor having an increment number and generating a measurement signal having pulses, and a counter with a first counter reading, the control unit comprising:

a revolving counter independent from the counter and having a second counter reading:

dependent upon parameters including the pulses of the measurement signal; and independent of the increment number of the crankshaft angle sensor during a working cycle of the engine;

a controller executing the engine control functions as a function of said second counter reading and the setpoint counter readings;

a synchronizer for synchronizing said second counter reading and the first counter reading; and the first counter reading being dependent upon said parameters.

8. The control unit according to claim 7, wherein said revolving counter is a dual counter with a predefined bit length.

9. The control unit according to claim 7, wherein said second counter reading interpolates between the pulses of the measurement signal.

10. The control unit according to claim 7, wherein the actuator drives are drives for charge cycle valves.

11. A control unit for actuator drives of an internal combustion engine having a control device generating control commands for controlling the actuator drives, the control commands containing setpoint counter readings for execution of engine control functions, a communications interface for exchanging data with the control device, an incremental crankshaft angle sensor having an increment number and generating a measurement signal having pulses, and a counter with a first counter reading, the control unit comprising:

a revolving counter independent from the counter and having a second counter reading:

dependent upon parameters including the pulses of the measurement signal; and independent of the increment number of the crankshaft angle sensor during a working cycle of the engine;

means for executing the engine control functions as a function of said second counter reading and the setpoint counter readings;

means for synchronizing said second counter reading and the first counter reading; and the first counter reading being dependent upon said parameters.

12. In an internal combustion engine having actuator drives, a control device generating control commands for controlling the actuator drives, the control commands containing setpoint counter readings for execution of engine control functions, a communications interface for exchanging data with the control device, an incremental crankshaft angle sensor having an increment number and generating a measurement signal having pulses, and a counter with a first counter reading, a control unit for the actuator drives comprising:

a revolving counter independent from the counter and having a second counter reading:

dependent upon parameters including the pulses of the measurement signal; and independent of the increment number of the crankshaft angle sensor during a working cycle of the engine;

a controller executing the engine control functions as a function of said second counter reading and the setpoint counter readings;

a synchronizer for synchronizing said second counter reading and the first counter reading; and the first counter reading being dependent upon said parameters.

13. A method for controlling an internal combustion engine having actuator drives, which comprises:

generating control commands for controlling the actuator drives as a function of at least one measured variable in a control device, the control commands containing setpoint counter readings for an execution of engine control functions;

transmitting the control commands to a control unit for the actuator drives;

changing a counter reading of a first counter as a function of pulses of a measurement signal from an incremental crankshaft angle sensor having an increment number, the first counter being a revolving counter with a maximum counter reading independent of the increment number of the crankshaft angle sensor during a working cycle of the engine; and executing, in the control unit, the engine control functions predefined by the control commands as a function of:

the counter reading of the first counter;

the setpoint counter readings; and a counter reading of a second counter independent of the first counter.

* * * * *